July 29, 1947.  C. D. McCLURE  2,424,622
TIMING DEVICE FOR RECORDERS
Filed Jan. 15, 1945

INVENTOR.
CARROLL D. McCLURE.
BY
Sidney A. Johnson
Attorney.

Patented July 29, 1947

2,424,622

UNITED STATES PATENT OFFICE 2,424,622

TIMING DEVICE FOR RECORDERS

Carroll D. McClure, Dallas, Tex., assignor, by mesne assignments, to Socony-Vacuum Oil Company, Incorporated, New York, N. Y., a corporation of New York Application January 15, 1945, Serial No. 572,955

10 Claims. (Cl. 234—36.5)

1

This invention relates to timing devices of the type which is particularly useful for the production of the timing lines on light-sensitive surfaces such as used in the production of seismograms, and has for an object the provision of a simple, reliable timing device which not only produces the timing lines but also produces symbols of distinctive character on selected timing lines.

This invention is particularly useful in systems of subsurface surveying where seismographic equipment is utilized to produce seismograms which show the overall period of elapsed time required for seismic waves to travel from their point of origin to a substratum where they are reflected or refracted to a detector of seismic waves. It is customary photographically to record the detected seismic waves by means of an oscillograph. Ordinarily, after the detonation of a charge of dynamite to generate seismic waves, a seismogram which shows the shot instant and the direct traveling and reflected waves covers a period of time of relatively short duration, such, for example, as from 5 to 10 seconds.

The accuracy with which the measurement of elapsed time can be made is of great importance in interpreting the seismogram. An error of a few thousandths of a second will frequently give rise to substantial errors in depth calculations of strata. It has heretofore been customary simultaneously to produce on every seismograph a plurality of timing lines, each spaced a predetermined time interval apart, for example, one-hundredth of a second. Since these timing lines are relatively close together, an interpreter of seismic data must be very careful to avoid mistakes in counting them. Until recently, relatively complicated circuits and many circuit elements have been necessary in order to produce the timing lines.

Further in accordance with the present invention, a vibrating reed is utilized not only to produce the timing lines but also to produce distinctive marking of every other timing line. This result is accomplished by utilizing the movement of the reed to generate an alternating current which has the same frequency as that of the reed. This alternating current is then applied to a galvanometer to produce distinctive marking of every other timing line.

For a more detailed explanation of the invention, and for further objects and advantages thereof, reference is to be had to the following detailed description taken in conjunction with the accompanying drawing, in which:

2

Fig. 1 fractionally illustrates the timing lines and distinctive markings produced on a seismogram in accordance with the present invention;

Figure 1:
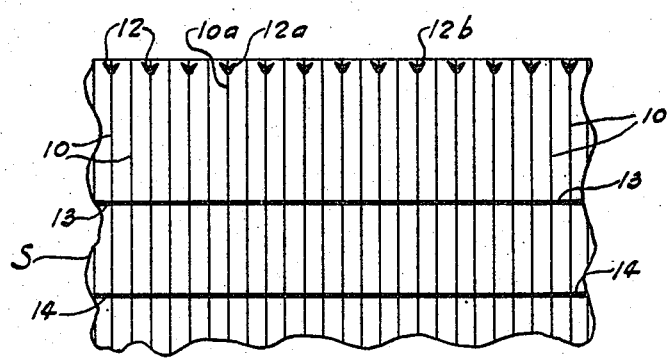
Figure 3:
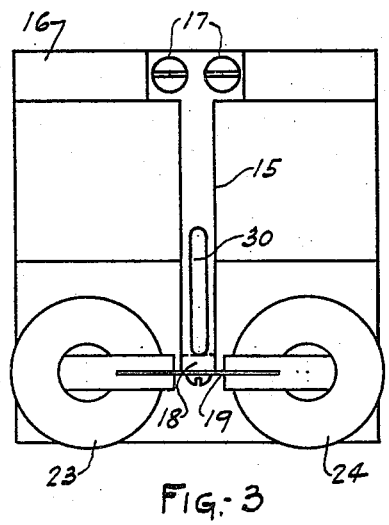
Fig. 3 is a plan view of the timing device of Fig. 2 including the base.
Figure 4:
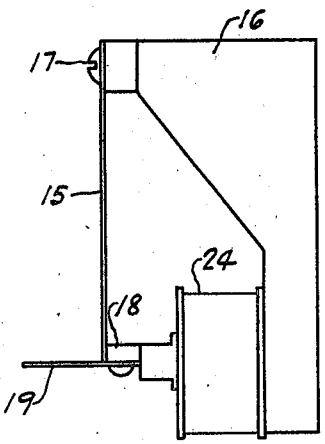
Fig. 4 is a side view of the device of Fig. 3.

Referring to the drawing, the invention in one form is utilized not only to produce on the seismogram S the series of timing lines 10 but also to produce the distinctive symbols or marks 12 which appear on every other one of the timing lines 10. In the absence of seismic signals, galvanometers will produce traces as indicated at 13 and 14. It will be readily understood that in calculating the time interval by counting the lines, one line, such as 10a, may be taken as the zero point and the subsequent lines may be counted in pairs by referring to the distinctive symbols following the line 10a. For example, from the symbol or marking 12a to the symbol or marking 12b, there are five symbols or ten lines and ten spaces indicating, in accordance with conventional practice, a lapse of time of one-tenth of a second.

Figure 2:
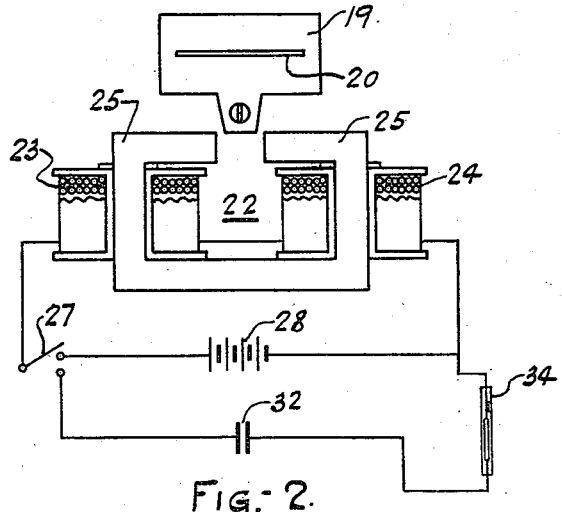
Fig. 2 is an end view, partly in section, with the base omitted, of a timing device embodying the invention and also including a wiring diagram.

The foregoing timing lines are produced by means of a vibrating reed 15 having a fixed end secured to a base 16 as by screws 17. The free end of the reed 15 has an armature 18 attached to it, as by brazing or welding, as well as a light-interrupting mask or shutter 19. As best shown in Fig. 2, the mask 19 has an elongated slot 20, provided for the interruption of a light beam projected from any suitable source (not shown).

In order to initiate vibration of the reed 15, an electromagnet 22 is provided. As shown, this electromagnet comprises a winding consisting of two coils 23 and 24 which encircle the respective arms of a C-shaped magnetic frame 25, of a low reluctance material such as Armco iron. When a switch 27 is moved to its first position an energizing circuit is completed for the coils 23 and 24. This circuit extends from a suitable source of supply such as a battery 28. The coils, though they may be, and have been, connected in parallel, are shown in Fig. 2 as connected in series. They produce a relatively strong magnetic flux which is concentrated by the ends of the core 25 in the region of the armature 18. This armature is also made of a low reluctance material, such as Armco iron. The armature is attracted by the magnetic flux and is moved downwardly, as viewed in Fig. 2, between the opposed arms of the core 25. This movement, of course, is against the normal resilience or elasticity of the reed 15.

When the switch 27 is moved to its second position the energizing circuit through the battery 28 is interrupted. The magnetic flux substantially instantly disappears to release the reed 15, which then vibrates at its natural period for a relatively long time interval. In typical embodiments of the invention, the reed 15 has vibrated for periods of from five to ten seconds, time intervals long enough for the recordation of the data from each shot fired in reflection and refraction seismic surveying.

By providing a long narrow opening 30 in the free end of the reed 15 relatively long time intervals of vibration are obtained. This opening is provided in the region where the greatest movement or deflection occurs. The opening materially reduces the resistance offered by the air to vibration of the reed. By so reducing the air resistance the time interval of usable vibrations has been greatly increased. The reed itself is preferably of a chromium-nickel-steel alloy having a composition approximately 12% chromium and 36% nickel. This material is sold on the market under the trade name of "Elinvar." It has properties which provide a substantially invariable modulus of elasticity. It possesses the same elasticity over relatively wide changes in temperature. Its length remains substantially constant because of the further characteristic of a substantial zero thermal coefficient of expansion. The period of the reed remains the same at all times and insures accuracy and equality in the spacing of the timing lines 10.

By providing the relatively soft iron core 25 and the armature 18, the reed may be readily attracted by the electromagnet to initiate the timing operations. The magnetic field attracts armature 18 and in moving the reed 15 stores energy in the reed. This energy is adequate to keep it in vibration for a long time interval following the opening of the energizing circuit.

The distinctive symbols 12 are also produced by the timing device. It has been found that there is enough residual magnetism in the soft iron core 25 to produce an alternating voltage in the coils 23 and 24 of the same frequency as that of the reed 15. This alternating voltage is in the form of a sine wave. Hence, by connecting the coils 23 and 24 in series with a capacitor 32 and a galvanometer element 34, the sine wave is reproduced by the trace of said galvanometer element 34. The galvanometer 34 is adjusted so that the peak or trough of each sine wave appears along one edge of the seismogram S, to produce the distinctive symbols or markings 12 on every other timing line 10. Since the frequency of the sine wave is the same as that of the reed, the marks or symbols 12 always appear exactly centered on every other timing line. Both the timing lines and the symbols are always in predetermined relation, one with the other. They are mechanically and electrically synchronized.

The capacitor 32 is preferably of substantial size, that is, it may have a capacity of around 500 microfarads. It is of sufficient size to produce a phase relation between the trace of the galvanometer and the timing lines so that the peak of each generated sine wave will fall exactly on a timing line.

Though it might at first appear that the period of time during which the reed will vibrate will be materially decreased by the generation of the alternative current, this has not been found to be the case. On the contrary, in accordance with the invention, a considerable gain, about one hundred per cent in vibration time, is achieved by reason of the provision of the elongated slot 30.

In numerous embodiments of the invention, a vibrating time of ten seconds has been consistently obtained, a time which is sufficiently long adequately to take care of records in all seismic surveys of the refraction or reflection type.

While a preferred embodiment of the invention has been described, it will be understood that modifications may be made without departing from the scope and spirit of the invention as set forth in the appended claims.

What is claimed is:

1. In a timing device comprising a reed having an armature carried by the portion thereof which is free to vibrate, and a winding for attracting said armature to initiate vibration of said reed, the combination of means operable after the energization of said winding for completing an electrical circuit in which said armature generates an alternating voltage having a period equal to that of said reed, and means responsive to said alternating voltage for producing a distinctive marking of every other one of the timing lines produced by vibration of said reed.

2. In a timing device for electric seismographs of the type in which the vibration of a reed is utilized to produce transverse lines on a seismogram in correlation with time, the combination of an armature carried by the end of said reed which is free to vibrate, a winding for magnetically attracting said armature to initiate vibration of said reed, means for connecting said winding in an electrical circuit for generation therein of an alternating voltage produced by movement of said armature relative to said winding and having a period equal to that of said reed, means for producing timing lines on said seismogram by vibration of said reed, and additional means responsive to said alternating voltage for producing distinctive marking of every other one of said timing lines.

3. The combination with an electric seismograph for producing seismograms, of a vibrating reed for producing timing lines on said seismogram, and means operable by vibration of said reed for producing distinctive symbols on certain of said timing lines.

4. In a timing device for electric seismographs, adapted for use in placing transverse lines on a seismogram as indications of elapsed time, of the type in which a vibrating reed is secured at one end to a base and the opposite end is free to vibrate, the improvement which comprises a reed provided with a relatively long slot in that portion of the reed which is free to vibrate, said slot by reducing the resistance offered by the air to the vibration thereof extending the time of vibration of said reed, and means associated with said free end of said reed for initiating vibration thereof and for producing said lines.

5. In a timing device for electric seismographs adapted for use in placing transverse lines on a seismogram as indications of elapsed time of the type in which a vibrating reed is secured at one end to a base and the opposite end is free to vibrate, the improvement which comprises a reed provided with a relatively long slot in that portion of the reed which is free to vibrate, said slot reducing the resistance offered by the air to the vibration thereof, and an armature supported by the free end of the reed for initiating vibration thereof.

6. In a timing device for electric seismographs adapted for use in placing transverse lines on a seismogram as indications of elapsed time of the type in which a vibrating reed secured at one end to a base and the opposite end free to vibrate has means carried by its free end for placing said lines on said seismogram, the improvement which comprises a reed provided with a relatively long slot in that portion of the reed which is free to vibrate, said slot reducing the resistance offered by the air to the vibration thereof, a winding having a magnetic core disposed adjacent the free end of said reed, an armature carried by the vibrating end of said reed to vary the magnetic flux cutting said winding to generate an alternating voltage therein of the same period as that of said reed, and means responsive to said voltage for placing marks on said transverse lines.

7. In a timing device for electric seismographs adapted for use in placing transverse lines on a seismogram as indications of elapsed time of the type in which a vibrating reed is secured at one end to a base and the opposite end is free to vibrate, the improvement which comprises a reed provided with a relatively long slot in that portion of the reed which is free to vibrate, said slot reducing the resistance offered by the air to the vibration thereof, an armature supported by the free end of the reed for initiating vibration, a winding having a magnetic core for attracting said armature, and means including a galvanometer responsive to voltage generated in said coil during vibration of said reed for producing a marking of every other one of said timing lines.

8. In a timing device for electric seismographs adapted for use in placing transverse lines on a seismogram as indications of elapsed time of the type in which a vibrating reed is secured at one end to a base and the opposite end is free to vibrate, the improvement which comprises a reed provided with a relatively long slot in that portion of the reed which is free to vibrate, said slot reducing the resistance offered by the air to the vibration thereof, a winding having a magnetic core, an armature carried by the vibrating end of said reed to vary the magnetic flux cutting said winding to generate an alternating voltage therein of the same period as that of said reed, a phase-correcting device included in circuit with said winding for synchronizing the peak voltages of said alternating current with certain of said timing lines.

9. In a timing device for electric seismographs adapted for use in placing transverse lines on a seismogram as indications of elapsed time of the type in which a vibrating reed is secured at one end to a base and the opposite end is free to vibrate, the improvement which comprises a reed provided with a relatively long slot in that portion of the reed which is free to vibrate, said slot reducing the resistance offered by the air to the vibration thereof, a winding having a magnetic core, an armature carried by the vibrating end of said reed to vary the magnetic flux cutting said winding to generate an alternating voltage therein of the same period as that of said reed, a phase-correcting device comprising a capacitor included in circuit with said winding for synchronizing the peak voltages of said alternating current with certain of said timing lines.

10. In combination, a reed having one end secured to a base and the opposite end free to vibrate, said reed having a relatively long slot in that portion of the reed which is free to vibrate, said slot reducing the resistance offered by the air to the vibration thereof, a winding having a magnetic core disposed adjacent the free end of said reed, an armature carried by the vibrating end of said reed to vary the magnetic flux cutting said winding to generate an alternating voltage therein of the same period as that of said reed, and means connected to said coil for energization by said generated voltage.

CARROLL D. McCLURE.

REFERENCES CITED

The following references are of record in the file of this patent:

UNITED STATES PATENTS

| Number | Name | Date |
| --- | --- | --- |
| 2,277,521 | McCarty | Mar. 24, 1942 |
| 2,297,251 | Schild | Sept. 29, 1942 |